Aug. 18, 1953

D. A. GULLAND 2,649,123

REMOVABLE CLAMP SHOE WITH TILTABLE
WORK ENGAGING ELEMENT
Filed Jan. 20, 1948

Inventor
Donald Q. Gulland
By Gregory S. Dolgorukov
Attorney

Patented Aug. 18, 1953

2,649,123

UNITED STATES PATENT OFFICE 2,649,123

REMOVABLE CLAMP SHOE WITH TILTABLE WORK ENGAGING ELEMENT

Donald A. Gulland, Detroit, Mich.

Application January 20, 1948, Serial No. 3,320

3 Claims. (Cl. 144—304)

1

This invention relates to clamp shoes or the like, and more particularly to a device which may be used as the work-contacting element of a clamp and comprising two parts connected to each other by means of a coupling permitting swiveling and/or universal movement.

Although the device is capable of use with various tools and machines other than clamps, it is convenient to describe it primarily as a clamp shoe.

This application is a continuation in part of my copending application Serial Number 617,465, filed September 20, 1945, for Swivel Nut.

An object of the invention is to provide a device usable as a clamp shoe and having improved features as to universal and/or swiveling action.

A further object of the invention is to provide a device of the type indicated which is of simplified construction, easily manufactured and installed, and sturdy and dependable in operation.

A further object is to provide a clamp shoe adapted to various types of clamps or the like, and adaptable to use in widely different installations.

A further object of the invention is to provide a device which is readily connected to and disconnected from the clamp or other device with which it is associated.

Further objects and advantages of the invention will be apparent from the following description, taken in connection with the appended drawing, in which.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
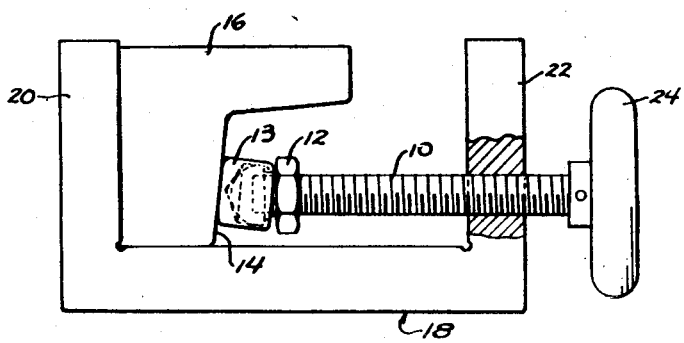
Fig. 1 is a view in elevation of an assembly including one form of device embodying the invention, showing the same in relation to the work.

Figure 1 is intended to illustrate any arrangement wherein a member such as the screw 10 exerts a thrust by means of a shoe 12, 13 upon the surface 14 of a piece of work 16. The surface 14 may, as in the illustrated example, be inclined from a plane normal to the direction of the thrust, and the point of application may be relatively inaccessible, as indicated by the fact that the work is of irregular shape and is positioned in a flask or jig 18, one wall 20 of which serves to hold the work while another wall 22 is tapped to serve as a reaction member for the screw 10. Pressure is applied by rotating the screw, as by handwheel 24. The inclination of surface 14 from a plane normal to the thrust line may represent merely the draft angle of a casting, but is frequently sufficiently great to require a universal coupling between the thrust-transmitting element 12 and the work-engaging element 13 of the shoe. In order to permit the screw 10 to be rotated while the shoe is in engagement with the work, a swivel connection between the two elements is required.

The clamp shown in Figures 1-4 comprises a thrust-transmitting element 12 in the form of a nut, provided with a threaded bore 26 which receives the screw 10. The bore 26 is formed with a flat bottom, as shown, to form a seat for the end of the screw, so that thrust will be transmitted directly to said seat and will not tend to shear the threads of the screw and bore. The nut 12 is formed with a collar 28 having a contour of hexagonal or other shape to receive a wrench for turning the nut onto the screw.

Connected to collar 28 by a cylindrical shank 30 is a bearing member 32 having a convex or part-spherical outer surface of greater diameter than the shank.

The shoe also includes a head 13 having a forward work-engaging surface 34, which may be plane, as shown, or may be grooved to engage a tubular piece of work, or otherwise suitably shaped. Opposite the surface 34 is a female conical bearing surface 36, which may be formed by an ordinary drill, and which is adapted to contact the convex surface of member 32 to permit both swiveling and universal movement therebetween with a minimum of friction. Extending rearwardly from the surface 36 is an annular flange 38 which is originally formed with a beveled edge as indicated at 40 in Fig. 4. When the elements 12, 13 are assembled together, the edge 40 is spun over to the form shown in Figure 2 to secure the two elements permanently together while still leaving enough clearance between said edge and the shank 30 to permit a limited amount of universal movement, as indicated by the broken lines in Figure 2.

The bearing member 32 may be formed with an axial bore 41 connecting the bore 26 with the space between the spherical surface of member 32 and the conical surface 36. Thus after the edge 40 is spun over, the assembly may be heat treated and quenched, the bore 41 serving to conduct water or other quenching liquid to otherwise inaccessible parts of the assembly. The bore 41 may also serve to retain lubricant for the device where lubrication is found desirable.

In the assembly of the nut 12 with the screw 10, it will often be found desirable to screw the two parts together with such force as to "jam" the threads, thus causing the nut to be retained on the screw in spite of such torque as will be exerted upon it by application and release of the clamp, while still permitting the nut to be removed by the greater torque exerted by a wrench.

In order to use this device in an arrangement as is shown in Figure 1, the work 16 is placed in the jig 18, and screw 10 is screwed through the wall 22. The shoe 12, 13 is then placed on the end of the screw, the nut 12 being tightened until the end of the screw seats against the bottom or bore 26. The screw is then rotated to bring the surface 34 into engagement with the work and to apply the requisite pressure thereto. The head 13 tilts to adapt itself to the inclination of the work surface, pressure being transmitted thereto from the end of the screw to the bottom of bore 26, thence through the annular contact between surface 32 and 36, and thence to the work.

Figure 5:
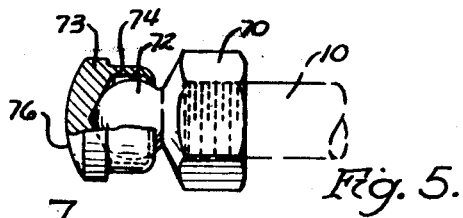
Figs. 5 and 6 are views in side elevation, with parts broken away, of two modified forms of the invention.

In the embodiment shown in Fig. 5, the nut, which in this figure is designated by the reference numeral 70, is formed with a knob 72 the surface of which forms the greater portion of a sphere. The work engaging head 73 is formed with a flange 74 which is spun inwardly to engage the knob 72 with a sliding fit, to permit universal and swiveling movement. The forward surface 76 of the head 73 is here shown as convex, which is merely illustrative of the various shapes which this surface may take in the several embodiments.

Figure 2:
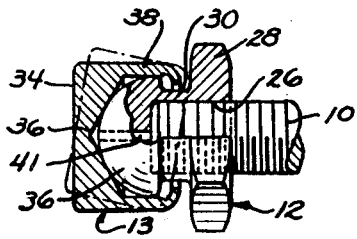
Fig. 2 is an enlarged longitudinal section of the same form of device.
Figure 3:
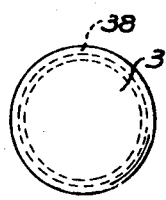
Fig. 3 is an end elevation of the work-engaging part of the device.
Figure 4:
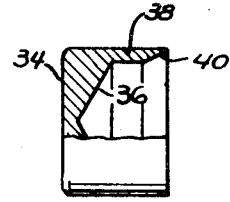
Fig. 4 is a side view, partly in section, of the part shown in Fig. 3.
Figure 6:
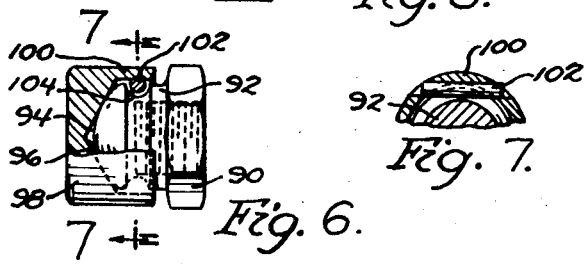
Figure 7:
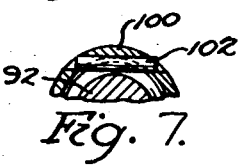
Fig. 7 is a cross-sectional view, with parts broken away, taken on line 7—7 of Fig. 6.

In the embodiment shown in Figs. 6 and 7, the nut 90 receives the screw 10 in the same manner as shown in Fig. 2, and is formed at its forward end with a cylindrical shank 92 terminating in a part-spherical surface 94 which cooperates with a conical surface 96 in a work-engaging head 98, the latter being generally similar to the corresponding element shown in Fig. 4. The flange 100 of the head is in this case not spun over, but a retaining key or pin 102 is passed therethrough, in tangential relation to an annular groove 104 which is of such size as to allow clearance to permit a limited amount of universal, as well as swiveling, movement between the two elements of the shoe.

Although the invention has been described with reference to certain specific embodiments thereof, it may be embodied in other forms within the skill of artisans in this art, and is not limited except in accordance with the terms of the following claims.

I claim:

1. As a separate article of manufacture, a universal pressure shoe adapted to be detachably connected to devices including pressure screws, said shoe including a pressure screw engaging member comprising a body having a cylindrical recess threaded to engage a pressure screw and a flat bottom adapted to be contacted by the end of the pressure screw to receive and transmit pressure forces, nut flats provided on said body, and a part-sphere provided on the end of said body adjacent the bottom of said recess; and a work-engaging member comprising a cup-shaped body having a depressed conical bottom adapted to be engaged by said part-sphere and connected to said pressure screw engaging member.

2. As a separate article of manufacture, a universal pressure shoe adapted to be detachably connected to devices including pressure screws, said shoe including a pressure screw engaging member comprising a body having a cylindrical recess threaded to engage a pressure screw and a flat bottom adapted to be contacted by the end of the pressure screw to receive and transmit pressure forces, nut flats provided on said body, and a part-sphere provided on the end of said body adjacent the bottom of said recess and co-axially therewith; and a work-engaging member comprising a cup-shaped body having a depressed conical bottom adapted to be engaged by said part-sphere, the edge of said cup-shaped body being bent to embrace said part-sphere to retain said members together but to provide for limited relative rocking of said members and their rotation through the 360 degree angle.

3. As a separate article of manufacture, a universal pressure shoe adapted to be detachably connected to devices including pressure screws, said shoe including a pressure screw-engaging member comprising a hollow cylindrical body closed at one of its ends by a flat bottom and internally threaded to engage the thread of a pressure screw with the end of the screw contacting the bottom of the recess, a half-sphere integrally formed on said closed end of said cylindrical body co-axially therewith, said half-sphere being of larger diameter than said cylindrical body to provide a shoulder, wrench flats provided on the open end of said body; and cup-shaped work-engaging member having a depressed conical bottom engaged by said half-sphere, the circular edge of said work-engaging member being bent to engage the shoulder of said pressure screw engaging member to retain said members together but to provide for limited relative rocking of said members and their rotation through the 360 degree angle.

DONALD A. GULLAND.

References Cited in the file of this patent

UNITED STATES PATENTS

| Number | Name | Date |
|---|---|---|
| 150,900 | Silver et al. | May 12, 1874 |
| 600,389 | Swan | Mar. 8, 1898 |
| 1,041,979 | Dikeman | Oct. 22, 1912 |
| 1,105,193 | Gerion | July 28, 1914 |
| 1,167,599 | Sanford | Jan. 11, 1916 |
| 1,387,996 | Menger | Aug. 16, 1921 |
| 1,498,638 | Periolat | June 24, 1924 |
| 1,533,688 | Bergh | Apr. 14, 1925 |
| 1,940,738 | Anderson | Dec. 26, 1933 |
| 2,100,069 | Creveling | Nov. 23, 1937 |
| 2,261,254 | Humphrey | Nov. 4, 1941 |
| 2,266,507 | Neumann et al. | Dec. 16, 1941 |
| 2,346,088 | Shobert | Apr. 4, 1944 |
| 2,427,353 | Gagesteyn | Sept. 16, 1947 |
| 2,432,352 | Strotz | Dec. 9, 1947 |
| 2,472,658 | Gilbert | June 7, 1949 |